US012481265B2

(12) United States Patent
Shao

(10) Patent No.: US 12,481,265 B2
(45) Date of Patent: Nov. 25, 2025

(54) METHOD AND SYSTEM FOR INTELLIGENT MONITORING OF CNC MACHINE TOOLS BASED ON INDUSTRIAL INTERNET OF THINGS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/961,676

(22) Filed: Nov. 27, 2024

(65) Prior Publication Data
US 2025/0093840 A1   Mar. 20, 2025

(30) Foreign Application Priority Data
Sep. 29, 2024   (CN) .......................... 202411364867.5

(51) Int. Cl.
G05B 19/406   (2006.01)
(52) U.S. Cl.
CPC .. *G05B 19/406* (2013.01); *G05B 2219/33099* (2013.01)
(58) Field of Classification Search
None
See application file for complete search history.

(56) References Cited

U.S. PATENT DOCUMENTS 10,838,394 B2 * 11/2020 Kamiguchi ........ G05B 19/4184
10,926,367 B2 *  2/2021 Kasahara ........... B23Q 17/0909
(Continued)

FOREIGN PATENT DOCUMENTS

CN   101670533 A   3/2010
CN   103586740 A   2/2014
(Continued)

OTHER PUBLICATIONS

First Office Action in Chinese Application No. 202411364867.5 mailed on Dec. 11, 2024, 22 pages.
(Continued)

*Primary Examiner* — Jennifer L Norton
(74) *Attorney, Agent, or Firm* — PORUS IP LLC

(57) ABSTRACT

Provide are a method and a system for intelligent monitoring of a CNC machine tool based on IIoT. The method includes: obtaining appearance information of a tool based on a tool image; in response to the tool being in an operational state, obtaining operational state information of the tool and a CNC machine; issuing an image acquisition instruction to control a camera to acquire a workpiece image and determining workpiece information based on the workpiece image; processing the workpiece information to generate machining quality information; retrieving the appearance information, operational state information, and machining quality information, and generating tool wear information; issuing an alert based on the tool wear information; determining a tool to be replaced based on the tool wear information, and controlling a tool replacement assembly to clip a spare tool from a spare tool box; and issuing a rotational speed adjustment instruction and/or a frequency adjustment instruction.

14 Claims, 5 Drawing Sheets

(56) References Cited

U.S. PATENT DOCUMENTS

| | | | |
|---|---|---|---|
| 11,048,227 B2* | 6/2021 | Takahara | G05B 19/4065 |
| 11,590,621 B2* | 2/2023 | Liu | B23Q 15/16 |
| 12,346,104 B2* | 7/2025 | Ottnad | B23K 31/02 |
| 2004/0153259 A1* | 8/2004 | Lee | B23Q 17/0961 |
| | | | 702/34 |
| 2004/0179915 A1* | 9/2004 | Hill | G05B 19/406 |
| | | | 409/141 |
| 2010/0063616 A1* | 3/2010 | Mori | G05B 19/406 |
| | | | 700/173 |
| 2011/0173788 A1 | 7/2011 | Stanik et al. | |
| 2018/0272491 A1* | 9/2018 | Yang | B23Q 17/0971 |
| 2019/0049939 A1* | 2/2019 | Kato | G05B 23/0205 |
| 2019/0152011 A1* | 5/2019 | Kummari | G06N 5/04 |
| 2020/0398398 A1* | 12/2020 | Takasu | B23Q 17/0957 |
| 2022/0097192 A1* | 3/2022 | Nishikawa | B23Q 17/0995 |
| 2022/0276141 A1* | 9/2022 | Xu | G01N 3/56 |

FOREIGN PATENT DOCUMENTS

| | | |
|---|---|---|
| CN | 103823409 A | 5/2014 |
| CN | 109782689 A | 5/2019 |
| CN | 110933057 A | 3/2020 |
| CN | 114449023 A | 5/2022 |
| CN | 115035120 A | 9/2022 |
| CN | 118699877 A | 9/2024 |
| WO | 2017163201 A1 | 9/2017 |

OTHER PUBLICATIONS

Notification to Grant Patent Right for Invention in Chinese Application No. 202411364867.5 mailed on Jan. 3, 2025, 4 pages.

Dong, Jianglei et al., Overview of Tool Wear Status Recognition and Intelligent Monitoring, Chinese Journal of Turbomachinery, 61(6): 67-73, 2019.

* cited by examiner

METHOD AND SYSTEM FOR INTELLIGENT MONITORING OF CNC MACHINE TOOLS BASED ON INDUSTRIAL INTERNET OF THINGS

CROSS-REFERENCE TO RELATED APPLICATIONS

This application claims priority to Chinese Patent Application No. 202411364867.5, filed on Sep. 29, 2024, the entire contents of which are incorporated herein by reference.

TECHNICAL FIELD

The present disclosure relates to the field of computerized numerical control (CNC) machining, and in particular, to a method and a system for intelligent monitoring of a CNC machine tool based on Industrial Internet of Things (IIoT).

BACKGROUND

Tool wear is a common phenomenon in machining, which may reduce the machining accuracy of a workpiece, deteriorate the surface roughness of the workpiece, shorten the service life of equipment, generate cutting heat, increase downtime, and directly reduce productivity and profitability. To prevent losses caused by tool wear, most factories currently replace tools based on machining experience and average tool lifespan, often resulting in tools being worn but not replaced or being replaced prematurely despite minimal wear, which does not effectively solve the machining issues caused by tool wear. Therefore, it is crucial to monitor tool wear conditions, especially as modern automated manufacturing systems become more prevalent, making automated tool monitoring an inevitable trend.

In view of the above issues, it is desirable to provide a method and a system for intelligent monitoring of a CNC machine tool based on Industrial Internet of Things (IIoT), to better monitor the status of tools in CNC machines.

SUMMARY

One or more embodiments of the present disclosure provide a method for intelligent monitoring of a computerized numerical control (CNC) machine tool based on Industrial Internet of Things (IIoT). The method is performed by an IIoT management platform of a system for intelligent monitoring of a CNC machine tool based on IIoT. The IIoT management platform is configured in a processor and communicates with a sensing control platform via a sensor network platform, the sensor network platform is configured on a communication device, and the sensing control platform is configured in a host computer of a CNC machine and configured to control an operation of a camera and an operation of a machine monitoring device. The method includes: obtaining appearance information of a tool based on a tool image, and storing the appearance information in a data center of the IIoT management platform; the tool image being acquired by the camera at a preset acquisition time; the preset acquisition time including a time when the tool is in a stop state; in response to the tool being in an operational state, obtaining operational state information of the tool and the CNC machine based on the machine monitoring device, and sending the operational state information to the data center of the IIoT management platform via the communication device; issuing an image acquisition instruction to the sensing control platform to control the camera to acquire a workpiece image of a workpiece at a preset frequency, and determining workpiece information based on the workpiece image; processing the workpiece information to generate machining quality information, and storing the machining quality information in the data center of the IIoT management platform; retrieving the appearance information, the operational state information, and the machining quality information from the data center, and generating tool wear information; issuing, based on the tool wear information, an alert via at least one of a machine warning device and an interactive screen to indicate a wear condition of the tool; determining a tool to be replaced based on the tool wear information, and controlling a tool replacement assembly to clip a spare tool from a spare tool box; and issuing at least one of a rotational speed adjustment instruction and a frequency adjustment instruction; the rotational speed adjustment instruction being configured to control a rotational speed of a tool holder group to adjust a machining intensity of the tool to be replaced; the frequency adjustment instruction being configured to adjust an acquisition frequency of the camera.

One or more embodiments of the present disclosure provide a system for intelligent monitoring of a computerized numerical control (CNC) machine tool based on Industrial Internet of Things (IIoT). The system includes an IIoT management platform, a sensor network platform, and a sensing control platform. The IIoT management platform is configured in a processor and communicates with the sensing control platform via the sensor network platform, the sensor network platform is configured on a communication device, and the sensing control platform is configured in a host computer of a CNC machine and configured to control an operation of a camera and an operation of a machine monitoring device. The IIoT management platform is configured to: obtain appearance information of a tool based on a tool image, and store the appearance information in a data center of the IIoT management platform; the tool image being acquired by the camera at a preset acquisition time; the preset acquisition time including a time when the tool is in a stop state; in response to the tool being in an operational state, obtain operational state information of the tool and the CNC machine based on the machine monitoring device, and send the operational state information to the data center of the IIoT management platform via the communication device; issue an image acquisition instruction to the sensing control platform to control the camera to acquire a workpiece image of a workpiece at a preset frequency, and determine workpiece information based on the workpiece image; process the workpiece information to generate machining quality information, and store the machining quality information in the data center of the IIoT management platform; retrieve the appearance information, the operational state information, and the machining quality information from the data center, and generate tool wear information; issue, based on the tool wear information, an alert via at least one of a machine warning device and an interactive screen to indicate a wear condition of the tool; determine a tool to be replaced based on the tool wear information, and control a tool replacement assembly to clip a spare tool from a spare tool box; and issue at least one of a rotational speed adjustment instruction and a frequency adjustment instruction; the rotational speed adjustment instruction being configured to control a rotational speed of a tool holder group to adjust a machining intensity of the tool to be replaced; the frequency adjustment instruction being configured to adjust an acquisition frequency of the camera.

One or more embodiments of the present disclosure provide a non-transitory computer-readable storage medium storing computer instructions, wherein after reading the computer instructions in the storage medium, a computer executes the method for intelligent monitoring of a CNC machine tool based on IIoT described in the preset disclosure.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
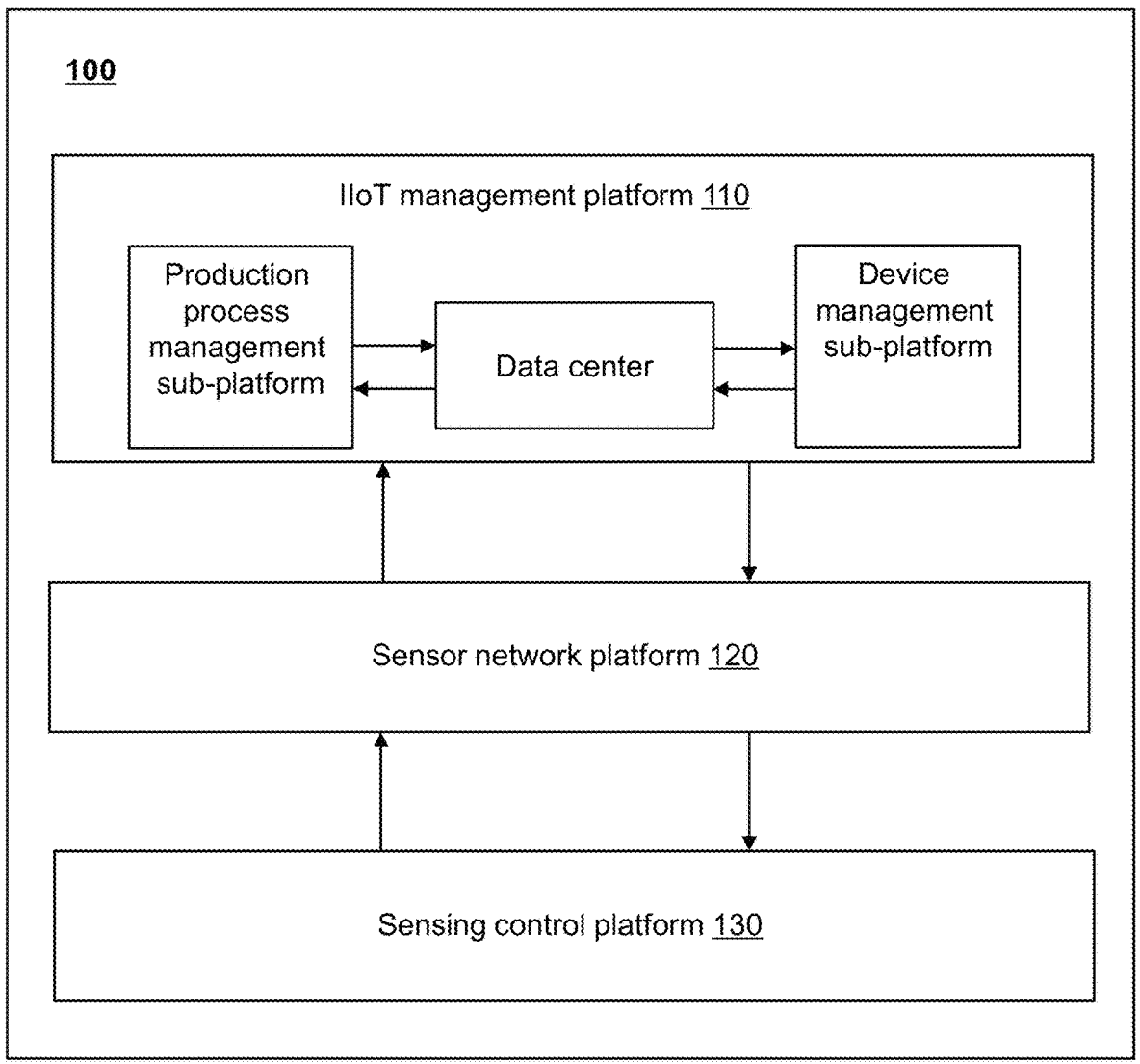
FIG. 1 is a schematic diagram illustrating a platform structure of a system for intelligent monitoring of a CNC machine tool based on IIoT according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a schematic diagram illustrating a platform structure of a system for intelligent monitoring of a CNC machine tool based on IIoT according to some embodiments of the present disclosure. As shown in FIG. 1, in some embodiments, a system 100 for intelligent monitoring of a CNC machine tool based on IIoT (hereinafter referred to as the system 100) includes an IIoT management platform 110, a sensor network platform 120, and a sensing control platform 130.

The IIoT management platform 110 refers to a platform that coordinates and harmonizes the connection and collaboration between various functional platforms, aggregates all information of the system 100, and provides sensor management and control management functions for the operation of the system 100.

In some embodiments, the IIoT management platform 110 supervises and manages the lifecycle of a CNC machine. For example, the IIoT management platform 110 manages a machining process of the CNC machine, and the repair and maintenance of the CNC machine and its components.

In some embodiments, the CNC machine includes a host computer.

In some embodiments, the IIoT management platform 110 includes a data center, a production process management sub-platform, and a device management sub-platform.

The data center may be configured to store all operational information of the system 100. In some embodiments, the data center may be configured in a storage device for storing data related to the intelligent monitoring of a CNC machining tool, etc. For example, the data center stores appearance information of a tool, operational state information of the tool and the CNC machine at a plurality of time points, a workpiece image, workpiece information, a tool trajectory, machining quality information, tool wear information at at least one processing stage, or the like. The data center may also store other data generated during the intelligent monitoring of the CNC machining tool.

The production process management sub-platform interacts with the data center and is configured to manage the production process. Through the production process management sub-platform, it is possible to simulate a CNC machining process of a CNC machining task, and generate parameters of the NC machining process, which include a tool spindle speed, a feed rate, the tool trajectory, or the like. The production process management sub-platform may also be configured to compare actual trajectory data of the tool with simulated trajectory data of the tool to determine whether there is any abnormality in the actual tool trajectory and issue an alarm if detecting an abnormality.

The device management sub-platform interacts with the data center and is configured to supervise and manage equipment condition. The device management sub-platform may monitor and warn of tool service life through a tool condition monitoring model.

In some embodiments, the IIoT management platform 110 may be configured in a processor.

The sensor network platform 120 refers to a functional platform for managing sensing communications. In some embodiments, the sensor network platform 120 may perform functions of sensing communications for sensing information and sensing communications for control information.

In some embodiments, the sensor network platform 120 may connect the IIoT management platform 110 and the sensing control platform 130 to realize information interaction between the IIoT management platform 110 and the sensing control platform 130.

In some embodiments, the sensor network platform 120 may be configured on a communication device.

The sensing control platform 130 refers to a functional platform for generating sensing information and executing control information.

In some embodiments, the sensing control platform 130 may be configured in a host computer of the CNC machine for controlling the operation of a camera and an operation of a machine monitoring device.

In some embodiments, the sensing control platform 130 may execute CNC machining instructions and collect operation parameters of the CNC machine. The operation parameters of the CNC machine may include, but are not limited to, a spindle speed, tool information (e.g., a tool model, a tool material, a tool shape, etc.), a coordinate (e.g., a tool coordinate, a workpiece coordinate, etc.), a device load (e.g., a spindle load, an X-axis load, a Y-axis load, a Z-axis load, etc.), a feed rate, or the like.

In some embodiments of the present disclosure, based on the system 100, a closed loop of information operation can be formed between the IIoT management platform and the sensing control platform. Under unified management, coordinated and orderly operation is achieved, thereby enabling information-based and intelligent monitoring of CNC machining tools.

It should be understood that the system 100 and its platform structure shown in FIG. 1 may be implemented through a variety of approaches. In some embodiments, the processor, the communication device, the storage device, the host computer of the CNC machine, etc., may be integrated in one place or set up separately.

It should be noted that the above descriptions of the system 100 and the platform structure thereof are provided for the sake of convenience and should not be construed as limiting the present disclosure to the scope of the cited embodiments. It is to be understood that for a person skilled in the art, after understanding the principle of the system 100, it is possible to arbitrarily combine various platforms or constitute a sub-system to be connected to other platform structures without departing from this principle. For example, the platforms may share a common storage module or may each have a respective storage module. Modifications such as these are within the scope of protection of the present disclosure.

Figure 2:
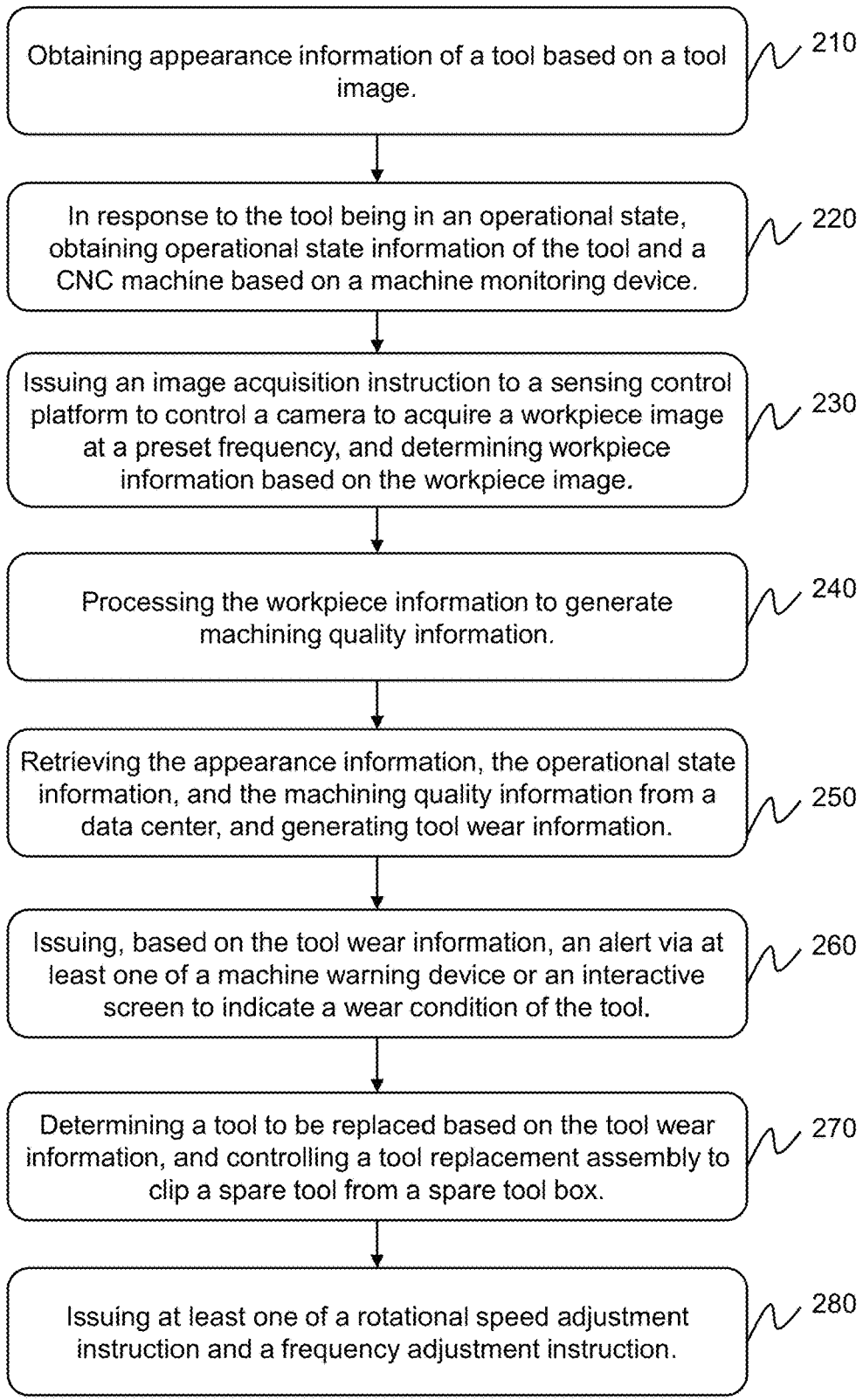
FIG. 2 is a flowchart illustrating an exemplary process of a method for intelligent monitoring of a CNC machine tool based on IIoT according to some embodiments of the present disclosure.

FIG. 2 is a flowchart illustrating an exemplary process of a method for intelligent monitoring of a CNC machine tool based on IIoT according to some embodiments of the present disclosure.

In some embodiments, the method for intelligent monitoring of a CNC machine tool based on IIoT includes: obtaining appearance information of a tool based on a tool image, and storing the appearance information in a data center of a IIoT management platform; the tool image being acquired by the camera at a preset acquisition time; the preset acquisition time including a time when the tool is in a stop state; in response to the tool being in an operational state, obtaining operational state information of the tool and the CNC machine based on a machine monitoring device, and sending the operational state information to the data center of the IIoT management platform via the communication device; issuing an image acquisition instruction to a sensing control platform to control the camera to acquire a workpiece image of a workpiece at a preset frequency, and determining workpiece information based on the workpiece image; processing the workpiece information to generate machining quality information, and storing the machining quality information in the data center of the IIoT management platform; retrieving the appearance information, the operational state information, and the machining quality information from the data center, and generating tool wear information; issuing, based on the tool wear information, an alert via at least one of a machine warning device and an interactive screen to indicate a wear condition of the tool; determining a tool to be replaced based on the tool wear information, and controlling a tool replacement assembly to clip a spare tool from a spare tool box; and issuing at least one of a rotational speed adjustment instruction and a frequency adjustment instruction; the rotational speed adjustment instruction being configured to control a rotational speed of a tool holder group to adjust a machining intensity of the tool to be replaced; the frequency adjustment instruction being configured to adjust an acquisition frequency of the camera.

As shown in FIG. 2, process 200 includes the following operations. In some embodiments, the process 200 may be executed by a processor of the IIoT management platform 110.

In 210, obtaining appearance information of a tool based on a tool image.

The tool image refers to an image that records an appearance, a structure, and a detail of the tool. In some embodiments, the tool image may include at least one image of the tool at different time points. For example, the tool image includes an initial tool image when the tool has not yet been used, at least one image after the tool has been used, or the like.

In some embodiments, the tool may be an indexable turning tool employed by the CNC machine, including but not limited to, at least one of a cylindrical turning tool, a drill, a boring tool, a cut-off tool, and a threading tool.

In some embodiments, the processor may send an image acquisition instruction to the sensing control platform to cause the sensing control platform to control a camera to acquire the tool image at a preset acquisition time. The preset acquisition time may include a time when the tool is in a stop state, e.g., a time before the CNC machine starts working and/or a time after the CNC machine finishes working, and may also be other time that the tool is in the stop state.

The appearance information of the tool refers to information that visually reflects a tool status. For example, the appearance information of the tool may include a status of a cutting edge of the tool, such as at least one of a deformation (also referred to as an edge flatness) of the cutting edge or a change in edge width. As another example, the tool appearance information may also include other information such as a shape, a size, a color, a surface texture, etc., of the tool. By way of example, the deformation of the cutting edge includes, but is not limited to, at least one of notching of the edge, skewing of the edge.

In some embodiments, the appearance information of the tool may be represented in the form of an appearance information vector. Merely by way of example, the appearance information vector may be denoted as (s, w), wherein s denotes the deformation of the cutting edge, with 0 indicating that the cutting edge is deformed and 1 indicating that the cutting edge is not deformed; w denotes the change in the edge width, which may be expressed as a multiple of an initial edge width. For example, (0, 0) means that the cutting edge is not deformed and there is no change in the edge width. As another example, (1, 0.3) means that the cutting edge is deformed and the edge width changes, increasing by 0.3 times the initial edge width. The initial edge width refers to the edge width of the tool when the tool has not been used.

In some embodiments, the processor may perform preprocessing on the tool image, analyze the preprocessed tool image, and determine the tool appearance information. The preprocessing may include grayscale processing.

Merely by way of example, the processor may perform the grayscale processing on the initial tool image and the tool image at at least one time point after the tool is used to obtain images to be analyzed. Further, the processor may compare and analyze the images to be analyzed using an image comparison algorithm to determine whether the cutting edge is deformed and the change in the edge width after the tool is used. The image comparison algorithm may include at least one of a pixel comparison-based technique, a histogram comparison-based technique, a feature extraction and matching-based technique, and a deep learning-based technique, or other algorithms capable of performing image difference comparison.

In some embodiments, the processor determines a deformation value of the cutting edge based on a comparison of the tool image corresponding to a time point with the initial tool image. The processor determines that the cutting edge is deformed if the deformation value is greater than a preset deformation threshold. The deformation value of the cutting edge refers to a difference between a position of the cutting edge in the tool image and an initial position of the cutting edge in the initial tool image, which may be expressed as a numerical value, e.g., 0.1 mm, or the like. The preset deformation threshold refers to a minimum deformation value at which a quality problem may occur when using the tool for machining a product. The preset deformation threshold may be determined based on historical machining data, for example, the preset deformation threshold value may be set to 0.4 mm.

In some embodiments, the processor may determine, based on the tool image corresponding to a time point and the initial tool image, an edge width of the tool at the time point and the initial edge width of the tool, and thereby determine a value of change in the edge width of the tool at the time point compared to the initial edge width of the tool, and determine an edge width variation based on the value of change.

In some embodiments, the processor may send the appearance information of the tool to the data center of the IIoT management platform. The data center may be configured in a storage device. Exemplarily, the processor may send and store the appearance information of the tool via a communication device to the data center configured in the storage device.

In 220, in response to the tool being in an operational state, obtaining operational state information of the tool and the CNC machine based on a machine monitoring device.

In some embodiments, the operational state information may include at least one of a tool status or a machine status.

The tool status refers to information that reflects an operational state of the tool, and may include at least one parameter value reflecting the operational state of the tool, e.g., tool vibration data, tool machining sound, tool temperature data, or the like, and other information that may reflect the operating state of the tool.

In some embodiments, the tool status may include the operational state information of the tool at at least one time point.

The machine status refers to information that reflects an operational state of the CNC machine, and may include at least one parameter value reflecting the operating state of the CNC machine, such as, an operating power, a current level, or the like, and other information that may reflect the operating state of the CNC machine.

In some embodiments, the operational state of the CNC machine includes the operational state information of the CNC machine at the at least one time point.

In some embodiments, the processor may obtain the operational state of the tool and the operational state of the CNC machine in various ways.

In some embodiments, in response to the tool being in the operational state, the processor may obtain the operational state of the tool and the operational state of the CNC machine based on the machine monitoring device.

More descriptions of the machine monitoring device may be found in FIG. 1 and the related descriptions thereof.

In some embodiments, the operational state information may also include at least one of cutting fluid change information or a cutting force data sequence. The processor may collect the cutting fluid change information via a camera and a first monitoring component configured in a cutting fluid storage tank, and collect the cutting force data sequence of the tool via a second monitoring component. More descriptions of the embodiment may be found in FIG. 4 and the related descriptions thereof.

In some embodiments, the processor may send the operational state information (e.g., the operational state of the tool and the operational state of the CNC machine) to the data center of the IIoT management platform. The data center may be configured in a storage device. Exemplarily, the processor may send the operational state information (e.g., the operational state of the tool and the operational state of the CNC machine) to a host computer of the CNC machine via the communication device and store the operational state information in the storage device.

In 230, issuing an image acquisition instruction to the sensing control platform to control a camera to acquire a workpiece image at a preset frequency, and determining workpiece information based on the workpiece image.

The workpiece image refers to an image that records an appearance, a structure, and a detail of a workpiece. In some embodiments, the workpiece image may include at least one image of the workpiece in at least one processing stage.

The processing stage refers to one or more specific machining operations or phases into which a production or machining process is divided for processing the workpiece according to machining requirements and process characteristics for the workpiece. Each processing stage may correspond to a different machining region for processing the workpiece. Exemplarily, the at least one processing stage may include at least one of a rough processing stage, a semi-finish processing stage, and a finish processing stage. For workpieces with particularly high precision requirements, the at least one processing stage may further include a polishing processing stage and an ultra-precision processing stage.

In some embodiments, the processor may issue the image acquisition instruction to the sensing control platform to control a camera to acquire the workpiece image at the preset frequency.

The image acquisition instruction refers to an operational instruction that instructs a device to perform image acquisition and recording. The device may be a camera. Exemplarily, the processor may control, via the sensing control platform, the camera to acquire the workpiece image based on the image acquisition instruction.

The preset frequency refers to a preset parameter that directs the device to perform image acquisition at a specific frequency.

In some embodiments, the processor may determine the preset frequency based on a user input. For example, the processor may obtain the preset frequency input by a user via a user terminal, send the preset frequency to the host computer of the CNC machine via the communication device, and store the preset frequency in the storage device.

In some embodiments, different processing stages may correspond to different preset frequencies. The higher the machining precision required for a processing stage, the higher the preset frequency corresponding to the processing state.

In some embodiments, the processor may determine a current processing stage of the workpiece based on a tool trajectory, and determine the preset frequency corresponding to the current processing stage.

Merely by way of example, the processor may acquire a tool trajectory over a period of time in real-time, compare the tool trajectory acquired in real-time with historical tool trajectories stored in the storage device, determine a target trajectory with a highest similarity, and determine the processing stage corresponding to the target trajectory as the current processing stage.

The workpiece information refers to a set of data describing attributes of the workpiece, and may include at least one piece of data describing an attribute of the workpiece. For example, the workpiece information includes at least one of workpiece appearance, a workpiece dimension, a dimensional deviation, a workpiece color. The workpiece information may also include other data that reflects the attributes of the workpiece. The dimensional deviation refers to a difference between an actual size of the workpiece and a standard size.

In some embodiments, the processor may process (e.g., grayscale processing) the workpiece image, determine, based on a processed workpiece image, at least one of the workpiece appearance, the workpiece dimension, and the workpiece color via an image analysis algorithm. The processor may further compare the workpiece appearance with a standard image via the image comparison algorithm, determine dimensional deviations of a plurality of key points of the workpiece, and determine the workpiece information based on at least one of the workpiece appearance, the workpiece dimension, the workpiece color, and the dimensional deviations.

The standard image refers to a workpiece image obtained by processing in an ideal state. In some embodiments, the standard image may be determined based on standard workpiece appearance extracted from a modeling software.

The plurality of key points of the workpiece refer to feature points or positions on the workpiece that are of special importance and/or require special attention. The key points may be used to characterize key attributes such as a shape, a size, a positional relationship, etc. of the workpiece, which play an important role in assuring the quality, accuracy, and functionality of the workpiece.

The image analysis algorithm may include at least one of a graphic size measurement algorithm, a color feature extraction algorithm, and an appearance feature extraction algorithm. More descriptions of the image comparison algorithm may be found in the relevant descriptions in operation 210.

In 240, processing the workpiece information to generate machining quality information.

The machining quality information refers to data characterizing quality of the workpiece machined by the tool. In some embodiments, the machining quality information may include the quality of at least one region of the workpiece. The quality of the workpiece may be expressed as a value between 0 and 1, with a larger value indicating better machining quality.

The at least one region of the workpiece corresponds to the at least one processing stage of the workpiece. For example, different processing stages may correspond to different regions on the workpiece. More descriptions of the processing stages may be found in related descriptions in the present disclosure (e.g., in operation 230 and the related descriptions thereof).

In some embodiments, the processor may determine the machining quality information based on the magnitude of a local dimensional deviation of the workpiece. For example, the processor may acquire at least one local point on the workpiece where dimensional deviation exists and determine the machining quality of each local point based on the Equation (1):

$$q = 1 - \Delta s/s_0, \qquad (1)$$

wherein, q denotes the machining quality of a local point, $\Delta s$ denotes the dimensional deviation, and $s_0$ denotes the local workpiece dimension. More descriptions of the dimensional deviation may be found in the previous related description. The local workpiece dimension refers to a minimum dimension of a region of the workpiece in which the local point is located, which may be determined based on a workpiece design drawing and the processing stage corresponding to the local point. More descriptions of the processing stage and its corresponding region may be found in related descriptions in the present disclosure (e.g., in operation 230 and the related descriptions thereof).

In some embodiments, the processor may determine the machining quality information based on the machining quality of at least one local point on the workpiece where dimensional deviation exists.

In some embodiments, the processor may also retrieve the tool trajectory corresponding to the workpiece information, and generate the machining quality information based on workpiece material information, the tool trajectory, and the workpiece information.

In some embodiments, the processor may also determine trajectory discrepancy information based on a standard tool trajectory and the tool trajectory corresponding to the workpiece, and generate the machining quality information based on the trajectory discrepancy information, the workpiece material information, and the workpiece information.

Figure 3:
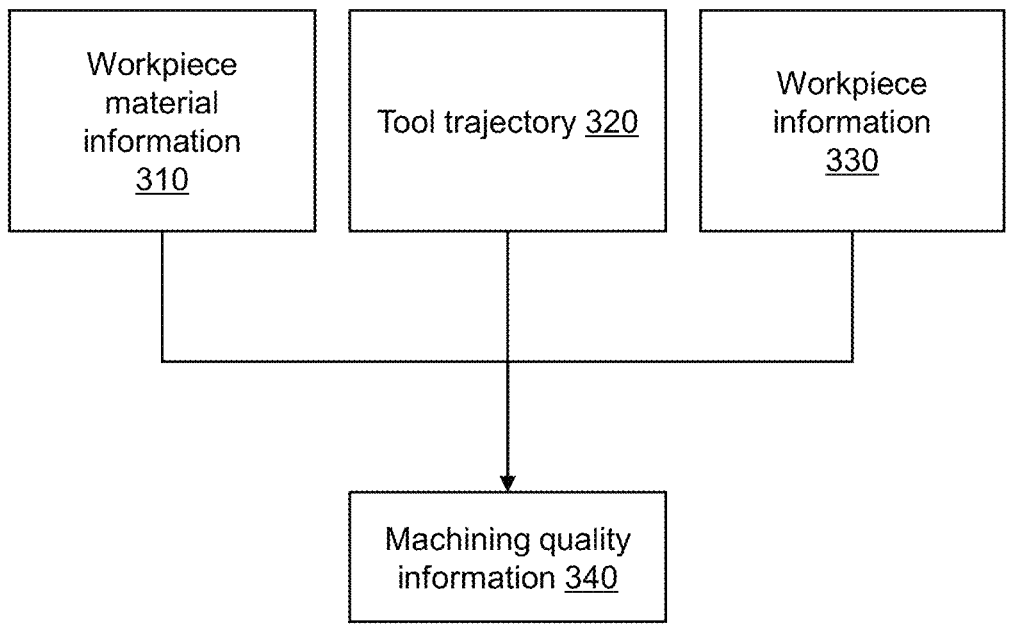
FIG. 3 is a schematic diagram illustrating an exemplary process for generating machining quality information according to some embodiments of the present disclosure.

More descriptions of this embodiment may be found in related descriptions in FIG. 3 and the related descriptions thereof.

In some embodiments, the processor may send the machining quality information to the data center of the IIoT management platform. The data center may be configured in a storage device. Exemplarily, the processor may send and store the machining quality information to the data center via the communication device.

In 250, retrieving the appearance information, the operational state information, and the machining quality information from the data center, and generating tool wear information.

During a cutting process, the tool wears because of continuous friction with the workpiece, impact, and high temperature. The tool wear information refers to data that characterizes a degree of wear of the tool. In some embodiments, the tool wear information may be represented by a value between 0 and 1, where 0 indicates no wear, and 1 indicates severe wear that necessitates tool replacement. The larger the value is, the greater the degree of wear of the tool.

In some embodiments, the processor may determine the tool wear information in various ways.

Merely by way of example, the processor may retrieve the appearance information, the operational state information, and the machining quality information of the tool from the data center, and determine the tool wear information by querying a wear degree reference table based on the appearance information, the operational state information, and the machining quality information.

In some embodiments, the wear degree reference table includes reference appearance information, reference operational state information, reference machining quality information, and corresponding reference wear information.

In some embodiments, the wear degree reference table may be determined based on historical machining data. For example, the processor may determine the reference appearance information, the reference operational state information, and the reference machining quality information based on historical appearance information, historical operational state information, and historical machining information of the tool in the historical machining data. The processor may determine, by obtaining manual input, the reference wear information corresponding to the tool under machining conditions of the aforementioned reference appearance information, reference operational state information, and reference machining quality information. Exemplarily, the reference wear information is marked as 1 when the tool is deformed, the reference wear information is marked as 1 when the edge width is greater than a preset width threshold, or the reference wear information is marked as 1 when the edge width is greater than the preset width threshold and the machining quality does not meet a quality threshold. The preset width threshold and the quality threshold may be set based on experience or actual needs.

In some embodiments, the processor may also evaluate the degree of wear of the tool during at least one time period based on the appearance information of the tool, the operational state of the tool, and the machining quality information, and generate, based on the degree of wear of the tool during the at least one time period, the tool wear information.

Figure 4:
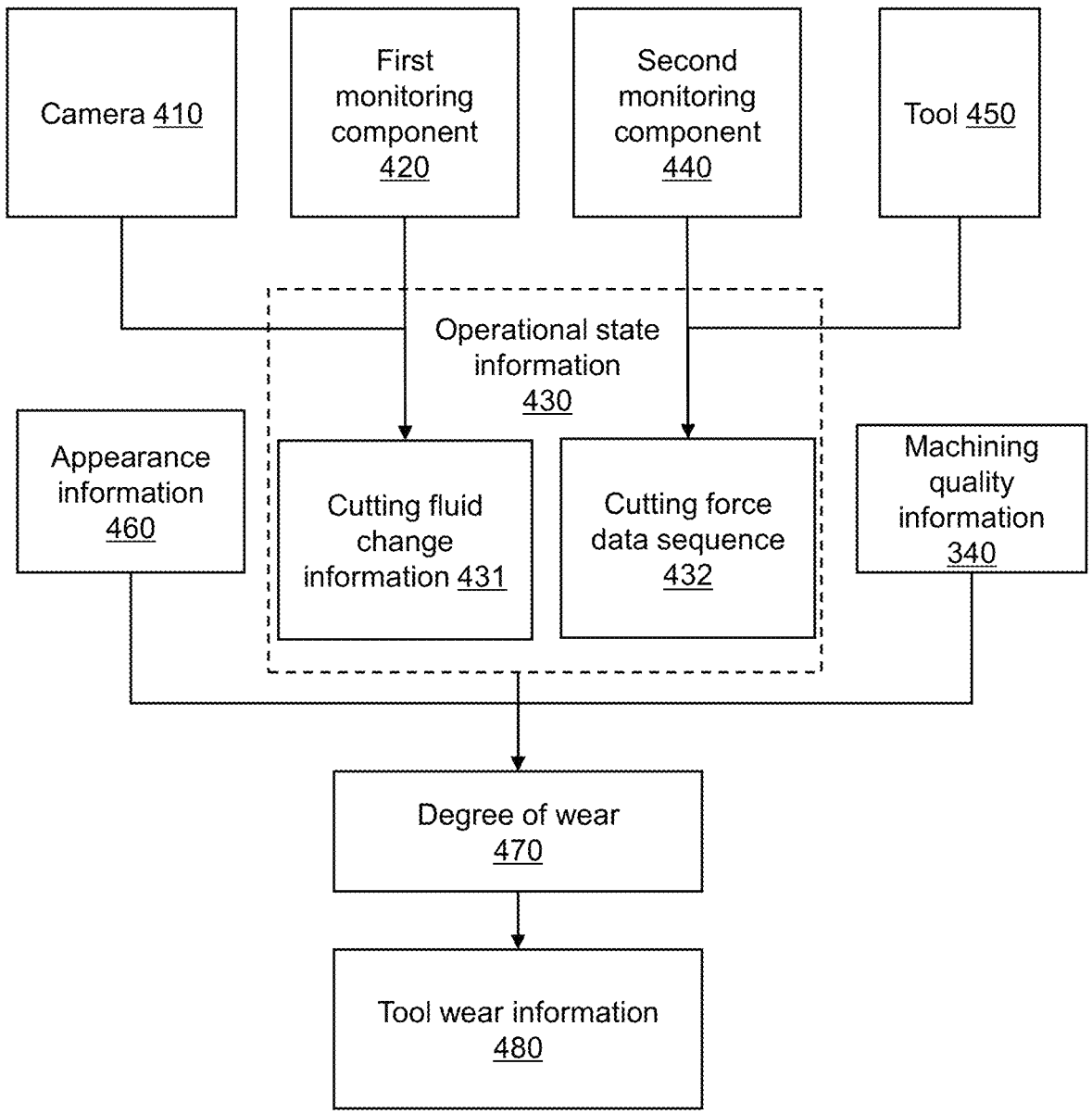
FIG. 4 is a schematic diagram illustrating an exemplary process for determining tool wear information according to some embodiments of the present disclosure.

More descriptions of this embodiment may be found in FIG. 4 and the related descriptions thereof.

In 260, issuing, based on the tool wear information, an alert via at least one of a machine warning device and an interactive screen to indicate a wear condition of the tool The machine warning device refers to a device provided on a machine for alerting a machining state of the machine. In some embodiments, the machine warning device may be configured to indicate a machining malfunction, the tool wear condition, or the like.

The interactive screen refers to a screen that is capable of realizing human-computer interaction, which may be a screen of the CNC machine, a screen of a user terminal, or the like. The interactive screen may be managed by the IIoT management platform, and a user may control the CNC machine via the interactive screen and obtain relevant information about the CNC machine, such as a model of the machine, a state of the machine, machining information, warning information, or the like.

The alert refers to a message that indicates the wear condition of the tool. In some embodiments, the alert may include, but is not limited to, at least one of an audible and visual alert, a text alert, and an alert window.

In some embodiments, the processor may issue the alert via at least one of the machine warning device and the interactive screen to indicate the wear condition of the tool based on the tool wear information. For example, the processor may issue the alert via at least one of the machine warning device and the interactive screen when the tool wear information reaches a wear degree threshold. The wear degree threshold refers to a critical value of tool wear. If the degree of wear of the tool reaches the critical value, the tool needs to be replaced. In some embodiments, the wear degree threshold may be determined based on experience or actual needs.

In 270, determining a tool to be replaced based on the tool wear information, and controlling a tool replacement assembly to clip a spare tool from a spare tool box.

In some embodiments, the processor may determine the tool with the tool wear information greater than or equal to the wear degree threshold as the tool to be replaced.

In some embodiments, the processor may send a tool clipping instruction to the sensing control platform to control the tool replacement assembly to clip the spare tool from the spare tool box and place the spare tool at a designated location for a staff to replace the tool.

The tool replacement assembly refers to an assembly for assisting in performing a tool replacement. In some embodiments, the tool replacement assembly may include a plurality of components that work in concert with each other. For example, the tool replacement assembly may include a robotic arm, a clipping component, a driving device, etc. The clipping component is configured to clip the spare tool in the spare tool box, the robotic arm is configured to control the movement of the clipping component, and the driving device is configured to provide power. The spare tool box refers to a container for storing the spare tool.

In 280, issuing at least one of a rotational speed adjustment instruction and a frequency adjustment instruction.

In some embodiments, in response to determining that an adjustment condition is triggered, the processor may issue at least one of the rotational speed adjustment instruction and the frequency adjustment instruction to the CNC machine via the sensing control platform. The adjustment condition may include that the processor determines the tool to be replaced.

The rotational speed adjustment instruction refers to an instruction configured to adjust the rotational speed of a tool holder group.

In some scenarios, when the degree of wear of a tool reaches the wear degree threshold, the tool may not be replaced immediately and may continue to conduct other work. In such cases, it is necessary to adjust the rotational speed of the tool holder group to reduce a machining intensity of the tool to be replaced, thus avoiding sudden damage to the tool, which affects the machining quality.

In some embodiments, the rotational speed adjustment instruction may include a rotational speed adjustment value. The rotational speed adjustment value may be determined based on the degree of wear of the tool to be replaced. The higher the degree of wear of the tool to be replaced, the lower the machining intensity the tool may withstand, and the lower the rotational speed of the tool holder group.

The frequency adjustment instruction refers to an instruction configured to adjust an image acquisition frequency of a camera.

In some embodiments, the frequency adjustment instruction may include an adjusted acquisition frequency. The processor may determine the adjusted acquisition frequency based on a preset adjustment rule. Exemplarily, the preset adjustment rule may include that the higher the degree of wear of the tool to be replaced, the higher the adjusted acquisition frequency.

In some embodiments, the processor may determine the adjusted acquisition frequency by Equation (2):

$$f' = f*(1+r), \qquad (2)$$

wherein, f' denotes the adjusted acquisition frequency; f denotes a preset frequency, more details may be found in the description in 230; and r denotes the degree of wear of the tool to be replaced, which may be determined based on the tool wear information corresponding to the tool to be replaced.

In some embodiments of the present disclosure, the tool wear information is generated by analyzing the appearance information of the tool, the operational state information of the tool and the CNC machine, and the machining quality information. Based on the tool wear information, an alert is issued and the tool to be replaced is determined, so that the machining intensity of the tool to be replaced can be adjusted in a timely manner before replacement. Through the above method, it is possible to more accurately determine the time of tool replacement, reduce waste due to premature replacement or damage to the tool, and thus better ensure the productivity of the CNC machine. Timely identification of the tool to be replaced and adjustment of the machining intensity thereof before replacement can better prevent safety risks caused by sudden breakage or failure due to the tool reaching the end of its service life, thus ensuring production safety. Timely replacement of worn tools can prevent the impact of severe tool wear on workpiece quality, ensuring machining precision and improving product quality.

It should be noted that the foregoing descriptions of the process 200 are intended to be exemplary and illustrative only and do not limit the scope of application of the present disclosure. For a person skilled in the art, various modifications and changes may be made to the process 200 under the guidance of the present disclosure. However, these modifications and changes remain within the scope of the present disclosure.

FIG. 3 is a schematic diagram illustrating an exemplary process for generating machining quality information according to some embodiments of the present disclosure. As shown in FIG. 3, the process for generating the machining quality information includes the following. In some embodiments, the process for generating the machining quality information is performed by a processor of the IIoT management platform 110.

In some embodiments, the processor may retrieve a tool trajectory corresponding to workpiece information to generate the machining quality information 340, based on workpiece material information 310, the tool trajectory 320, and the workpiece information 330.

The tool trajectory refers to positional movement data of a tool during operation of a CNC machine. In some embodiments, the tool trajectory may be represented in a form of sequential data, including positional coordinates of at least one sampling point on the tool at at least one time point. The at least one sampling point on the tool refers to at least one point on the tool that may contact with a workpiece; and the positional coordinates may be determined based on a preset coordinate system.

In some embodiments, the plurality of time points include at least one time point corresponding to at least one processing stage. More descriptions of the at least one processing stage may be found in the related descriptions of operation 230 of FIG. 2.

In some embodiments, the processor may control the CNC machine to automatically acquire the tool trajectory.

The workpiece material information refers to information that characterizes a material of the workpiece, for example, an alloy steel, an aluminum alloy, or the like. In some embodiments, the workpiece material information may be determined based on a user input.

More descriptions of the workpiece information may be found in the related descriptions of operation 230 of FIG. 2.

More descriptions of the machining quality information may be found in the related descriptions of operation 240 of FIG. 2.

In some embodiments, the processor may generate the machining quality information based on the workpiece material information, the tool trajectory, and the workpiece information.

In some embodiments, the processor may determine a current processing stage based on the tool trajectory, determine a corresponding current machining region based on the current processing stage, and determine a degree of matching between the tool trajectory and a contour of the current machining region in the workpiece information. The degree of matching is related to a sub-degree of matching between a coordinate of a tool position corresponding to at least one time point in the tool trajectory and a coordinate of the contour of the current machining region.

If the coordinate of the tool position at a time point is consistent with the coordinate of the contour of the current machining region, the processor may determine that the sub-degree of matching corresponding to the time point is 1. If the coordinate of the tool position at a time point is not consistent with the coordinate of the contour of the current machining region, the processor may determine a distance between the coordinate of the tool position and a coordinate origin, and a distance between the coordinate of the contour of the current machining region and the coordinate origin, respectively. The processor may determine a ratio of a relatively small distance of the above distances to a relatively large distance of the above distances as the sub-degree of matching corresponding to the time point. It may be understood that the contour of the current machining region includes at least one point corresponding to the tool position at the at least one time point in the tool trajectory.

In some embodiments, the coordinate origin is set based on experience. For example, a center point of a contact surface between the workpiece and the CNC machine is designated as the coordinate origin. The coordinate of the contour of the current machining region refers to the coordinate of at least one key point on the contour of the current machining region.

In some embodiments, the processor selects points at which the coordinate of the tool position and the coordinate of the contour of the current machining region are not consistent as sampling points, and determines an average of the sub-degrees of matching corresponding to the sampling points as the degree of matching.

In some embodiments, the processor may determine a deformation value of the workpiece by querying a deformation reference table based on the workpiece material information. The deformation reference table includes reference material information for the workpiece and reference deformation values corresponding to the reference material information, which may be determined based on experience.

The deformation value reflects the possibility of shape change of the workpiece due to heat, friction, force, and other factors during machining. The greater the deformation value is, the more likely the workpiece may be deformed during machining, and thus more likely to influence the tool trajectory. The deformation value may be expressed as a value between 0 and 1, with a larger value indicating greater deformation.

In some embodiments, the processor may determine the machining quality information based on the degree of matching, the deformation value, and initial machining quality.

The initial machining quality refers to an initially determined machining quality of the workpiece. In some embodiments, the processor may determine the initial machining quality based on the machining quality of at least one local point on the workpiece where a dimensional deviation exists. More descriptions may be found in the descriptions related to determining the machining quality information in operation 240 of FIG. 2.

In some embodiments, the processor may determine the machining quality information by Equation (3).

$$q' = \begin{cases} q*m+w & q' < 1 \\ 1 & q' \geq 1 \end{cases}, \quad (3)$$

wherein, q' denotes the machining quality information, q denotes the initial machining quality, m denotes the degree of match, and w denotes the deformation value.

In some embodiments, the processor may determine trajectory discrepancy information based on a standard tool trajectory and the tool trajectory corresponding to the workpiece, and determine the machining quality information based on the trajectory discrepancy information, the workpiece material information, and the workpiece information.

The standard tool trajectory refers to a trajectory of the tool in an ideal state. The ideal state refers to a state of the tool when there is no interference from undesirable factors.

In some embodiments, the processor determines the standard tool trajectory based on a post-machining workpiece model. For example, the processor determines the post-machining workpiece model based on the workpiece information, determines a workpiece contour based on the post-machining workpiece model, and designates the workpiece contour as the standard tool trajectory. The post-machining workpiece model may be obtained by a modeling software (e.g., CAD, etc.).

The trajectory discrepancy information refers to information about a difference between the tool trajectory and the standard tool trajectory. In some embodiments, the trajectory discrepancy information includes a plurality of sets of discrepancy points.

In some embodiments, the processor compares the coordinates of at least one point of the tool trajectory with the coordinates of at least one point of the corresponding standard tool trajectory, identifies a point whose coordinates are inconsistent with the coordinates of the corresponding point of the standard tool trajectory, and determine the point of the tool trajectory and the corresponding point of the standard tool trajectory as a set of discrepancy points. Then the processor determines a distance between the point of the tool trajectory with inconsistent coordinates and the coordinate origin, and a distance between the corresponding point of the standard tool trajectory and the coordinate origin, and designates a ratio of a relatively small distance of the above two distances to a relatively large distance of the above two distances as the sub-degree of matching for the set of discrepancy points.

In some embodiments, the processor may determine a plurality of sets of discrepancy points and determine the degree of matching based on an average of the sub-degrees of matching corresponding to the plurality of sets of discrepancy points.

In some embodiments, the processor may determine the deformation value of the workpiece by querying the deformation reference table based on the workpiece material information. More descriptions of this embodiment may be found in the preceding related descriptions.

In some embodiments, the processor may determine the machining quality information based on the degree of matching, the deformation value of the workpiece, and the initial machining quality. More descriptions of the determination of the machining quality information may be found in the previous related description of Equation (3).

In some embodiments of the present disclosure, by analyzing the trajectory discrepancy information between the tool trajectory and the standard tool trajectory, a deviation of the tool trajectory can be obtained more accurately, thereby providing better data support for determining the degree of wear of the tool.

When the CNC machine performs machining on the workpiece, in addition to the tool wear potentially affecting the machining quality of the workpiece, the deformation of the workpiece itself may also affect the machining quality of the workpiece.

In some embodiments of the present disclosure, a change in the machining quality due to the tool wear can be more accurately determined by considering the tool trajectory, thereby providing reliable data support for analyzing the degree of wear of the tool, and facilitating more accurate determination of a wear condition of the tool.

FIG. 4 is a schematic diagram illustrating an exemplary process for determining tool wear information according to some embodiments of the present disclosure. As shown in FIG. 4, the process for generating the tool wear information may include the following content. In some embodiments, the process for generating the tool wear information is performed by a processor of the IIoT management platform 110.

In some embodiments, as shown in FIG. 4, the processor collects, via a camera 410 and a first monitoring component 420 configured in a cutting fluid storage tank, cutting fluid change information 431, and collects, via a second monitoring component 440, a cutting force data sequence 432 of a tool 450. Then the process assesses a degree of wear 470 of the tool 450 during at least one time period based on appearance information 460 of the tool 450, operational state information 430, and the machining quality information 340, and generates tool wear information 480 based on the degree of wear 470 of the tool 450 during the at least one time period. The operational state information 430 includes the cutting fluid change information 431 and the cutting force data sequence 432.

More descriptions of the camera and the tool may be found in FIG. 1 and the related descriptions thereof. More descriptions of the appearance information, the operational state information, the machining quality information, and the tool wear information may be found in FIG. 2 and the related descriptions thereof.

The cutting fluid storage tank refers to a tank-like device for storing a cutting fluid, for example, plastic barrels of different sizes, or the like. The cutting fluid refers to an industrial liquid used to cool and lubricate tools and machined parts in processes like cutting, shaving, and grinding of metals.

The cutting fluid change information refers to a sequence of data reflecting a change in the state of the cutting fluid over time. In some embodiments, the cutting fluid change information may include state information of the cutting fluid at at least one time point, wherein the state information may include, but is not limited to, a cutting fluid temperature, cutting fluid quality, or the like.

In some embodiments, the processor may obtain the cutting fluid change information via the first monitoring component.

The first monitoring component refers to a monitoring device for monitoring information related to the cutting fluid. Exemplarily, the first monitoring component may include, but is not limited to, at least one of a temperature sensor and a gravity sensor.

In some embodiments, the first monitoring component may be configured in the cutting fluid storage tank.

The cutting force data sequence refers to a sequence reflecting force data of the tool of a CNC machine over time. In some embodiments, the cutting force data sequence may include the magnitude of a force applied to the tool of the CNC machine at at least one time point.

In some embodiments, the processor may obtain the cutting force data sequence via the second monitoring component.

The second monitoring component refers to a monitoring device for monitoring force data of the tool of the CNC machine during machining. Exemplarily, the second monitoring component may include, but is not limited to, a pressure sensor.

In some embodiments, the second monitoring component may be configured on a tool holder group of the CNC machine. More descriptions of the tool holder group may be found in FIG. 1 and the related descriptions thereof.

The degree of wear during at least one time period refers to the degree of wear of the tool during at least one time period. Because tool machining may include at least one processing stage, the at least one processing stage may be divided into one or more time periods, the degree of wear of the tool within each processing stage may vary. More descriptions of the processing stage may be found in FIG. 2 and the related descriptions thereof.

In some embodiments, the processor may assess the degree of wear of the tool during the at least one time period in a plurality of ways based on the appearance information, the operational state information, and the machining quality information of the tool.

In some embodiments, the processor may determine a maximum value of the degree of wear of the tool during the at least one time period as the tool wear information.

Merely by way of example, the processor may query a wear degree reference table based on the appearance information of the tool to determine an initial degree of wear of the tool, and determine abnormal machine data based on the cutting fluid change information and the cutting force data sequence in the operational state information. Based on the abnormal machine data, the processor may determine an actual wear value corresponding to the abnormal machine data, and determine, based on the initial degree of wear and the actual wear value corresponding to the abnormal machine data, the degree of wear of the tool during the at least one time period.

More descriptions of the wear degree reference table may be found in the related descriptions of operation 250 of FIG. 2.

The initial degree of wear refers to the degree of wear of the tool before the CNC machine starts operating.

The abnormal machine data refers to a sequence of data that is abnormal in a portion of the cutting fluid change information and the cutting force data sequence. In some embodiments, the processor may compare the current cutting fluid change information and the current cutting force data sequence with standard cutting fluid change information and a standard cutting force data sequence, respectively, to determine unreasonable data therein, thereby determining the abnormal machine data. The unreasonable data includes unreasonable up-and-down fluctuations in the data, sudden changes in the values, or the like. For example, the processor may acquire an image corresponding to the cutting fluid change information and an image corresponding to the standard cutting fluid change information, compare and analyze the two images via a preset analysis algorithm, determine points at which there is a difference, and determine the data corresponding to a point at which the difference is greater than a preset tolerance as the abnormal machine data. The preset tolerance refers to an acceptable range of differences between the cutting fluid change information and the standard cutting fluid change information. The sequence of data that is abnormal in a portion of the cutting force data sequence may be determined in a similar manner.

The standard cutting fluid change information and the standard cutting force data sequence respectively refer to cutting fluid change information and a cutting force data sequence that are used as reference standards. In some embodiments, the processor may count occurrences of the same historical cutting fluid change information and historical cutting force data sequence in historical data, and determine the historical cutting fluid change information and the historical cutting force data sequence with the most occurrences as the standard cutting fluid change information and the standard cutting force data sequence, respectively.

The actual wear value that corresponds to the abnormal machine data characterizes an effect of an abnormal condition on the tool, and the actual wear value may be an average of wear values of a plurality of occurrences of wear corresponding to the same abnormal machine data.

In some embodiments, the processor may determine the wear value that corresponds to the abnormal machine data through vector matching.

Merely by way of example, the processor may build a library of standard vectors. The library of standard vectors includes a plurality of standard vectors and a plurality of corresponding labels. The standard vector includes the appearance information, the operational state information, the machining quality information, and the abnormal machine data, and the label is a reference wear value corresponding to the standard vector.

In some embodiments, the processor may construct a plurality of clustering vectors based on historical appearance information, historical operational state information, historical machining quality information, and historical abnormal machine data in historical data, and corresponding historical wear values for at least one historical time period. The processor may cluster the plurality of clustering vectors, and construct the standard vectors based on the historical appearance information, the historical operational state information, the historical machining quality information, and the historical abnormal machine data corresponding to cluster centers formed by clustering. The processor may designate the historical wear values for at least one historical time period corresponding to the cluster centers as the labels of the standard vectors. The historical wear value for the at least one historical time period is determined based on a difference between an initial degree of wear corresponding to a start time point of the time period and a final degree of wear corresponding to an end time point of the time period. The initial degree of wear and the final degree of wear may be determined based on a user input.

In some embodiments, the processor may construct a to-be-matched vector based on current appearance information, current operational state information, current machining quality information, and current abnormal machine data, match the to-be-matched vector with the standard vectors in the library of standard vectors, and determine a plurality of vector similarities between the to-be-matched vector with the plurality of standard vectors. The processor may then determine a standard vector with a highest vector similarity, and designate the label corresponding to the standard vector with the highest vector similarity as the actual wear value corresponding to the current abnormal machine data. The vector similarity may be expressed by a cosine similarity, a Euclidean distance, or the like.

In some embodiments, the processor may sum the initial degree of wear and the actual wear value corresponding to the abnormal machine data for the at least one time period to determine the degree of wear during the at least one time period.

In some embodiments, the processor may determine the degree of wear of the tool during at least one time period via a wear assessment model based on the appearance information, the operational state information, and the machining quality information.

The wear assessment model refers to a model configured to evaluate the degree of wear of the tool. In some embodiments, the wear assessment model is a machine learning model, e.g., a recurrent neural network (RNN), etc.

In some embodiments, an input of the wear assessment model includes the appearance information, the operational state information, and the machining quality information, and an output of the wear assessment model includes the degree of wear of the tool during at least one time period. The operational state information includes an operational state of the tool and the CNC machine, the cutting fluid change information, and the cutting force data sequence.

In some embodiments, the wear assessment model may be acquired by training in a plurality of ways. For example, the wear assessment model may be acquired by training a plurality of training samples with training labels. The training samples include sample appearance information, sample operational state information, and sample machining quality information. The training labels of the training samples are sample degrees of wear for at least one time period.

In some embodiments, the processor may determine, based on the historical data, the plurality of training samples used for training and historical wear data corresponding to the training samples. For each of the plurality of training samples, the processor may determine a historical degree of wear based on the historical wear data, and determine the historical degree of wear as the label corresponding to the training sample. For example, the processor may determine the training sample based on the historical appearance information, the historical operational state information, and the historical machining quality information in the historical data, and determine the historical degree of wear during at least one historical time period corresponding to the training sample as the training label of the training sample.

The historical degree of wear refers to a degree of wear of the tool in the historical data. The historical degree of wear during at least one time period may be determined based on a manually entered inspection result. For example, a staff member inspects the tool to determine the degree of wear through an instrument such as a laser scanning instrument, an ultrasonic flaw detector, or the like, and the processor obtains a result of manual monitoring of the degree of wear of the tool via a user terminal.

In some embodiments, the processor may input the sample appearance information, the sample operational state information, and the sample machining quality information into an initial wear assessment model, construct a loss function based on the training label and a degree of wear during at least one time period output by the initial wear assessment model, and update the initial wear assessment model based on the loss function. When an end-of-training condition is satisfied, the training of the initial wear assessment model is completed, and a trained wear assessment model is obtained. The end-of-training condition may include the loss function converging, a count of iterations reaching a threshold, or the like.

In some embodiments, the processor divides the training samples into a plurality of training datasets based on the historical wear data, conducts at least one round of training on the initial wear assessment model based on at least one of the plurality of training datasets to determine an initial training effect, and determines an adjusted learning rate based on the initial training effect. Then the processor continues to train the initial wear assessment model based on the adjusted learning rate and one or more unused datasets from the plurality of training datasets until the end-of-training condition is met, thereby obtaining the wear assessment model.

In some embodiments, the processor divides the training samples into the plurality of training datasets based on the historical wear data. For example, the processor may divide the historical degrees of wear corresponding to the training samples into a plurality of wear degree intervals, and determine the plurality of training datasets based on the wear degree intervals. The plurality of training datasets include a plurality of training datasets with different wear degree intervals and training datasets for which the degree of wear has not changed. Each of the plurality of training datasets may include a plurality of sets of training samples.

For at least one of the plurality of training datasets, the processor may determine the initial training effect by performing at least one round of training on the initial wear assessment model based on at least one set of training samples of the training dataset. The initial training effect may be determined based on a variance of differences between training labels and outputs of the model obtained by the above described training.

Merely by way of example, if a training dataset includes two sets of training samples, Set A and Set B, the processor conducts at least one round of training on the initial wear assessment model based on training samples in Set A to obtain a parameter-updated initial wear assessment model. The processor uses the training samples in Set A as an input of the parameter-updated initial wear assessment model, obtain a set of initial outputs, and determine differences between the initial outputs and the labels of the training samples in Set A. Then the processor determines the initial training effect based on a variance of the above differences. For example, the larger the variance is, the more unstable the outputs of the model is, and the worse the initial training effect is.

In some embodiments, the processor determines the adjusted learning rate based on the initial training effect, and continues to train the initial wear assessment model based on the adjusted learning rate and one or more unused datasets from the plurality of training datasets until the end-of-training condition is satisfied, thereby obtaining the trained wear assessment model.

The learning rate refers to step size for adjusting a parameter during the training of the wear assessment model. The learning rate determines the extent of parameter adjustment with each gradient update.

In some embodiments, the larger the variance is, the worse the initial training effect is, and the learning rate of the model training may be appropriately reduced to allow for better model convergence.

Merely by way of example, after the processor conducts at least one round of training on the initial wear assessment model based on the training samples in Set A. If the variance of the differences between the initial outputs of the initial wear assessment model and the labels of the training samples in Set A is greater than a preset variance threshold, then it indicates that the initial training effect is relatively poor, and model training requirements may not be met. In this case, the learning rate may be adjusted to a smaller value, and the processor continues to train the initial wear assessment model based on the adjusted learning rate using training samples in Set B until the end-of-training condition is satisfied to obtain the trained wear assessment model. The preset variance threshold may be determined based on prior experience and/or actual needs. More descriptions of the end-of-training condition may be found in the previous related descriptions.

In some embodiments of the present disclosure, by performing at least one round of training on the initial wear assessment model and adjusting the learning rate during the iterative training, the output result of the wear assessment model can be more accurate.

In some embodiments of the present disclosure, by using the trained wear assessment model to determine the degree of wear of the tool during at least one time period, the data processing rate of the system for intelligent monitoring of a CNC machine can be increased and time wasted during machining can be reduced.

In some embodiments of the present disclosure, by monitoring the cutting fluid change information and the cutting force data sequence for the CNC machine at different times, the degree of wear of the tool can be estimated more accurately and in line with actual situations, thus determine a reasonable time for tool replacement to avoid serious machining quality problems and save material costs.

Figure 5:
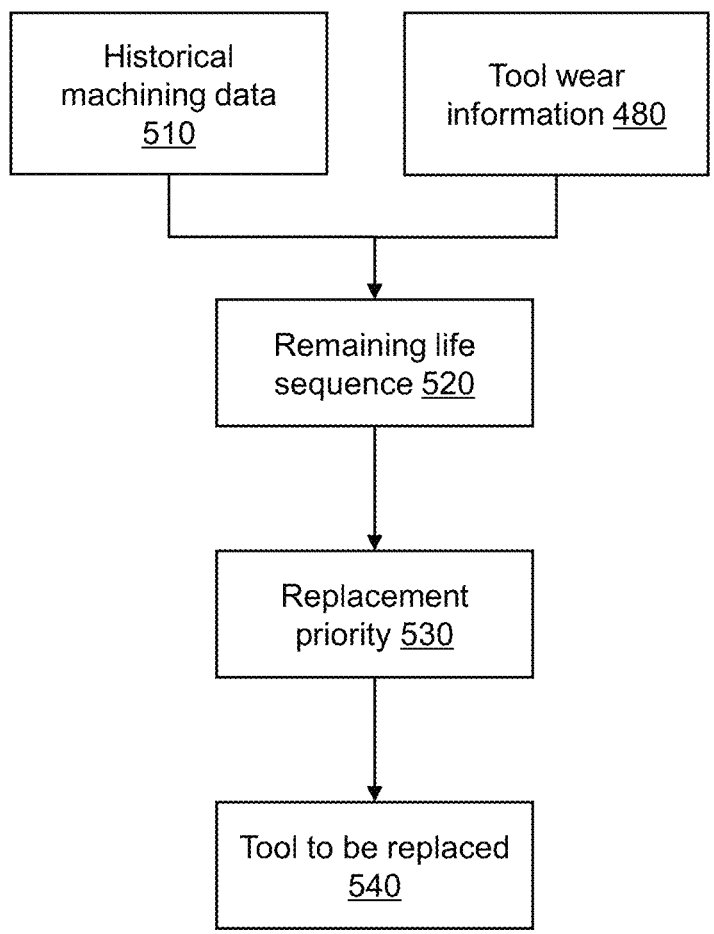
FIG. 5 is a schematic diagram illustrating an exemplary process for determining a tool to be replaced according to some embodiments of the present disclosure.

FIG. 5 is a schematic diagram illustrating an exemplary process for determining a tool to be replaced according to some embodiments of the present disclosure. As shown in FIG. 5, the process for determining the tool to be replaced may include the following. In some embodiments, the process for determining the tool to be replaced is performed by a processor of the IIoT management platform 110.

In some embodiments, the processor may determine a remaining life sequence 520 of a tool based on historical machining data 510 of the tool and tool wear information 480; determine a replacement priority 530 for the tool based on the remaining life sequence 520; and determine the tool to be replaced 540 based on the replacement priority 530.

More descriptions of the tool may be found in other contents of the present disclosure (e.g., description in connection with FIG. 1). More descriptions of the tool wear information, the tool to be replaced may be found in other contents of the present disclosure (e.g., description in connection with FIG. 2).

The historical machining data refers to data related to machining of a workpiece that has been completed by the tool. For example, the historical machining data includes historical tool wear information, a historical machining type, a historical machining count, or the like. The historical tool wear information refers to tool wear information in historical data. The historical machining type refers to a type of a material that has been machined by the tool. The history machining count refers to a count of times the tool has been used for machining.

In some embodiments, different tools in a CNC machine have respective corresponding historical machining data.

In some embodiments, the processor may obtain the historical machining data from a storage device. More descriptions of the storage device may be found in other contents of the present disclosure (e.g., description in connection with FIG. 1).

The remaining life sequence refers to a sequence consisting of a remaining service life of at least one tool in the CNC machine. The remaining service life refers to an amount of time the tool is still available for machining.

In some embodiments, the processor may determine the remaining life sequence of the tool in a plurality of ways based on the historical machining data of the tool and the tool wear information. For example, the processor may obtain the remaining life that corresponds to at least one tool in the CNC machine by querying a reference life table based on a tool type, a machining type, and the tool wear information, and thereby determining the remaining life sequence.

The reference life table refers to a table that includes a correspondence between a plurality of pieces of historical machining data, a plurality of pieces of tool wear information, and a plurality remaining service lives.

In some embodiments, the processor may determine historical remaining service lives corresponding to the historical machining data and the tool wear information of different tools into the reference life table. When the processor obtains a plurality of remaining service lives based on a same piece of historical machining data and a same piece of tool wear information, the processor determines an average value of the plurality of remaining service lives, and designate the average value as the corresponding remaining service life.

In some embodiments, the remaining life sequence of the tool is further correlated with a degree of wear of the tool during at least one time period.

More descriptions of the degree of wear during at least one time period may be found in other contents of the present disclosure (e.g., description in connection with FIG. 4).

In some embodiments, the processor may determine the remaining life sequence in a plurality of ways based on the degree of wear during at least one time period. For example, the processor may count a count of changes in wear of the tool based on the degree of wear of the tool during different time periods, obtain a raw remaining service life of the tool, and determine a target remaining service life based on the raw remaining service life.

Merely by way of example, the processor may use a wear value to characterize a change in the degree of wear of the tool before and after use. If the wear value is greater than a preset wear threshold, the processor records 1 change in the wear of the tool. The preset wear threshold characterizes a minimum wear value that affects the service life of the tool, and may be set based on a priori experience.

In some embodiments, the processor may divide the wear value into at least one preset stage, which may be determined by manual input, for example, ($p_0$, $p_0+\alpha$], ($p_0+\alpha$, $p_0+2\alpha$], ..., and so on. $p_0$ denotes the preset wear threshold, and $\alpha$ denotes a tolerance value pre-set based on prior experience. A preset stage refers to a predefined range of wear values.

In some embodiments, there may be more than one preset stage, and the processor may determine the count of changes in wear $C_1$, $C_2$ .... Cn between different preset stages.

The raw remaining service life refers to an initially determined tool service life. In some embodiments, the raw remaining service life of the tool may be determined based on the historical machining data of the tool and the tool wear information, more details may be found in the related previous description.

The manner of determining the raw remaining service life of the tool is the same as the manner of determining the remaining life sequence based on the historical machining data of the tool and the tool wear information, which may be found in the previous related description.

The target remaining service life refers to the remaining service life to be determined. In some embodiments, the target remaining service life is correlated to the count of changes in wear and predicted consumed service life. The predicted consumed service life refers to values of the consumed service life of the tool corresponding to a preset stage of different wear values.

In some embodiments, the predicted consumable life may be obtained by analyzing the historical machining data or experiments. Exemplarily, for the preset stage ($p_0$, $p_0+\alpha$], the processor may take the value of the consumed service life corresponding to the wear value $p_0+\alpha$ as the value of the consumed service life corresponding to the preset stage. The processor may select at least one machining process with the wear value of $p_0+\alpha$ as a reference machining process, obtain a remaining service life of the tool corresponding to the start of the reference machining process and a remaining service life of the tool corresponding to the end of the reference machining process by querying the reference life table, and determine a difference between the two remaining service lives. Then the processor may determine values of reference consumed service lives of the aforementioned reference machining process, and determine the predicted consumed service life corresponding to the preset stage based on an average value of the values of reference consumed service lives.

In some embodiments, the target remaining service life may be determined by Equation (4):

$$Y = Y_0 - [(\exp{^\wedge} C_1) * T_1 + (\exp{^\wedge} C_2) * T_2 + \ldots + (\exp{^\wedge} C_n) * T_n], \quad (4)$$

wherein, Y denotes the target remaining service life, Cn denotes the count of changes in wear occurring in the nth preset stage, $\exp{^\wedge}$Cn is an exponential function of Cn, and Tn denotes the predicted consumed service life corresponding to the nth preset stage of the degree of wear.

In some embodiments, the processor may obtain the remaining life sequence by obtaining a plurality of target remaining service lives following the manner described above.

In some embodiments of the present disclosure, by considering the degree of wear of the tool during at least one time period, when the degrees of wear are the same, the remaining service life is determined based on the count of times the tool has been used for machining, making the determined remaining service life sequence of the tool more accurate.

The replacement priority refers to the degree of necessity for replacing different tools. In some embodiments, the replacement priority may be represented by a numerical value, with a higher value indicating a greater necessity for tool replacement.

In some embodiments, the processor may determine the replacement priority based on the remaining life sequence in a plurality of ways. For example, the processor may rank tools to be replaced based on the corresponding remaining service life thereof, where the tool with the shortest remaining service life corresponds to the highest replacement priority.

In some embodiments, the processor may collect dust information based on an environmental sensor, and adjust the replacement priority based on the dust information and workpiece material information.

More descriptions of the workpiece material information may be found in other contents of the present disclosure (e.g., description in connection with FIG. 3).

The environmental sensor refers to a sensor that is configured to collect information related to the surrounding environment in which the tool is used for machining, for example, a dust detection sensor, etc.

The dust information refers to information related to dust around a CNC machine, for example, a dust concentration, etc. More descriptions of the CNC machine may be found in other contents of the present disclosure (e.g., description in connection with FIG. 1).

In some embodiments, the processor may adjust the replacement priority based on the dust information and the workpiece material information.

In some embodiments, for each of at least one tool in the CNC machine, the processor may obtain the historical machining data of the tool, record historical dust information, historical workpiece material information, and historical tool usage times in the historical machining data as associated data of the tool, and determine the associated data in which at least one of the historical dust information and the historical workpiece material information meets a preset condition as target data. The preset condition includes that the dust concentration is above a concentration threshold or the workpiece material is of a preset type.

The concentration threshold refers to a preset maximum value of the dust concentration. In some embodiments, the concentration threshold may be input by a user in advance. In some embodiments, the concentration threshold may be an average value of historical dust concentrations from the historical machining data.

The preset type refers to a predetermined type of a material to be processed. In some embodiments, the preset type may be set by the user. For example, the preset type may be a type of a material whose hardness meets a requirement, which may be determined based on user input.

In some embodiments, the processor may determine an average service life of the at least one tool based on an average value of theoretical service lives of the at least one tool corresponding to the respective target data, and update an adjusted service life of the current tool based on a time the current tool has been used and the aforementioned average service life. For example, the processor may determine the adjusted service life by subtracting the time the current tool has been used from the average service life. Then the processor may re-rank the tools to be replaced based on the adjusted service life to adjust the replacement priority.

In some embodiments of the present disclosure, taking into account the dust information can effectively prevent the instability in tool performance caused by certain workpiece materials that naturally produce dust, which may shorten the service life of the tool. Additionally, taking into account the workpiece material information can avoid cases where materials with high hardness (e.g., some alloy steels) cause undetectable micro-cracks during machining, which may shorten the service life of the tool. Considering the impact of both the dust information and the workpiece material information on the replacement priority can effectively prevent misjudgment of tool wear, thereby ensuring machining quality.

In some embodiments of the present disclosure, the remaining service life of different tools is determined based on extensive historical machining data. This approach ensures that the determined remaining service life sequence closely aligns with actual conditions, effectively avoiding significant discrepancies between theoretically calculated service life and real-world usage. As a result, the accuracy of identifying tools that need replacement is improved, enhancing the operational efficiency of the CNC machine.

One or more embodiments of the present disclosure provide a non-transitory computer-readable storage medium storing computer instructions, wherein after reading the computer instructions in the storage medium, a computer executes the above described method for intelligent monitoring of a CNC machine tool based on an IIoT.

Having thus described the basic concepts, it may be rather apparent to those skilled in the art after reading this detailed disclosure that the foregoing detailed disclosure is intended to be presented as illustrative example and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of the present disclosure.

Moreover, certain terminology has been configured to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure. Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties configured to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for intelligent monitoring of a computerized numerical control (CNC) machine tool based on Industrial Internet of Things (IIoT), wherein the CNC machine tool refers to a tool employed by a CNC machine, and the method is performed by an IIoT management platform of a system for intelligent monitoring of the CNC machine tool based on the IIoT;

the IIoT management platform is configured in a processor and communicates with a sensing control platform via a sensor network platform;

the sensor network platform is configured on a communication device;

the sensing control platform is configured in a host computer of the CNC machine and configured to control an operation of a camera and an operation of a machine monitoring device;

the method comprises:

obtaining appearance information of the CNC machine tool based on a tool image, and storing the appearance information in a data center of the IIoT management platform, the tool image being acquired by the camera at a preset acquisition time, the preset acquisition time including a time when the CNC machine tool is in a stop state;

in response to the CNC machine tool being in an operational state, obtaining operational state information of the CNC machine tool and the CNC machine based on the machine monitoring device, and sending the operational state information to the data center of the IIoT management platform via the communication device, wherein the obtaining operational state information of the CNC machine tool and the CNC machine includes:

collecting cutting fluid change information via the camera and a first monitoring component configured in a cutting fluid storage tank; and collecting a cutting force data sequence of the CNC machine tool via a second monitoring component;

issuing an image acquisition instruction to the sensing control platform to control the camera to acquire a workpiece image of a workpiece at a preset frequency, and determining workpiece information based on the workpiece image;

processing the workpiece information to generate machining quality information, and storing the machining quality information in the data center of the IIoT management platform;

retrieving the appearance information, the operational state information, and the machining quality information from the data center, and generating tool wear information, including:

evaluating a degree of wear of the CNC machine tool during at least one time period based on the appearance information, the operational state information, and the machining quality information, the operational state information including at least one of the cutting fluid change information and the cutting force data sequence; and generating the tool wear information based on the degree of wear of the CNC machine tool during the at least one time period;

issuing, based on the tool wear information, an alert via at least one of a machine warning device and an interactive screen to indicate a wear condition of the CNC machine tool;

determining the CNC machine will be replaced based on the tool wear information, and controlling a tool replacement assembly to clip a spare tool from a spare tool box;

issuing a rotational speed adjustment instruction and a frequency adjustment instruction based on the tool wear information;

controlling, using the issued rotational speed adjustment instruction, a rotational speed of a tool holder group that adjusts a machining intensity of the CNC machine tool that will be replaced; and adjusting, using the issued frequency adjustment instruction, an acquisition frequency of the camera.

2. The method of claim 1, wherein the processing of the workpiece information to generate machining quality information includes:

retrieving a tool trajectory corresponding to the workpiece information; and generating the machining quality information based on workpiece material information, the tool trajectory, and the workpiece information.

3. The method of claim 1, wherein the determining the CNC machine tool will be replaced based on the tool wear information includes:

determining a remaining life sequence of the CNC machine tool based on historical machining data and the tool wear information of the CNC machine tool;

determining a replacement priority of the CNC machine tool based on the remaining life sequence; and determining the CNC machine tool will be replaced based on the replacement priority.

4. The method of claim 3, wherein the remaining life sequence of the CNC machine tool is correlated with the degree of wear of the CNC machine tool during the at least one time period.

5. A system for intelligent monitoring of a computerized numerical control (CNC) machine tool based on Industrial Internet of Things (IIoT), wherein the CNC machine tool refers to a tool employed by a CNC machine, and the system comprises an IIoT management platform, a sensor network platform, and a sensing control platform;

the IIoT management platform is configured in a processor and communicates with the sensing control platform via the sensor network platform;

the sensor network platform is configured on a communication device;

the sensing control platform is configured in a host computer of the CNC machine and configured to control an operation of a camera and an operation of a machine monitoring device;

the IIoT management platform is configured to:

obtain appearance information of the CNC machine based on a tool image, and store the appearance information in a data center of the IIoT management platform, the tool image being acquired by the camera at a preset acquisition time, the preset acquisition time including a time when the CNC machine tool is in a stop state;

in response to the CNC machine tool being in an operational state, obtain operational state information of the CNC machine tool and the CNC machine based on the machine monitoring device, and send the operational state information to the data center of the IIoT management platform via the communication device, wherein to obtain the operational state information of the CNC machine tool and the CNC machine, the IIoT management platform is further configured to:

collect cutting fluid change information via the camera and a first monitoring component configured in a cutting fluid storage tank; and collect a cutting force data sequence of the CNC machine tool via a second monitoring component;

issue an image acquisition instruction to the sensing control platform to control the camera to acquire a workpiece image of a workpiece at a preset frequency, and determine workpiece information based on the workpiece image;

process the workpiece information to generate machining quality information, and store the machining quality information in the data center of the IIoT management platform;

retrieve the appearance information, the operational state information, and the machining quality information from the data center, and generate tool wear information, wherein to generate the tool wear information, the IIoT management platform is further configured to:

evaluate a degree of wear of the CNC machine tool during at least one time period based on the appearance information, the operational state information, and the machining quality information, the operational state information including at least one of the cutting fluid change information and the cutting force data sequence; and generate the tool wear information based on the degree of wear of the CNC machine tool during the at least one time period;

issue, based on the tool wear information, an alert via at least one of a machine warning device and an interactive screen to indicate a wear condition of the CNC machine tool;

determine the CNC machine tool will be replaced based on the tool wear information, and control a tool replacement assembly to clip a spare tool from a spare tool box;

issue a rotational speed adjustment instruction and a frequency adjustment instruction based on the tool wear information;

control, using the issued rotational speed adjustment instruction, a rotational speed of a tool holder group that adjusts a machining intensity of the CNC machine tool that will be replaced; and adjust, using the issued frequency adjustment instruction, an acquisition frequency of the camera.

6. The system of claim 5, wherein the IIoT management platform includes a production process management sub-platform, the data center, and a device management sub-platform.

7. The system of claim 5, wherein the IIoT management platform is further configured to:

retrieve a tool trajectory corresponding to the workpiece information;

generate the machining quality information based on workpiece material information, the tool trajectory, and the workpiece information.

8. The system of claim 5, wherein the IIoT management platform is further configured to:

determine a remaining life sequence of the CNC machine tool based on historical machining data and the tool wear information of the CNC machine tool;

determine a replacement priority of the CNC machine tool based on the remaining life sequence; and determine the CNC machine tool will be replaced based on the replacement priority.

9. The method of claim 1, wherein the evaluating of a degree of wear of the CNC machine tool during at least one time period based on the appearance information, the operational state information, and the machining quality information includes:

determining, based on the appearance information, the operational state information, and the machining quality information, the degree of wear of the CNC machine tool during the at least one time period via a wear assessment model; wherein the wear assessment model is a machine learning model, and the wear assessment model is obtained by training an initial wear assessment model.

10. The method of claim 9, further comprising:

determining, based on historical data, a plurality of training samples for training the initial wear assessment model and historical wear data corresponding to each of the plurality of training samples;

for each of the plurality of training samples, determining a historical degree of wear based on the historical wear data corresponding to the training sample, and determining the historical degree of wear as a label corresponding to the training sample;

dividing the plurality of training samples into a plurality of training datasets based on the historical wear data;

performing at least one round of training on the initial wear assessment model based on at least one of the plurality of training datasets, and determining an initial training effect;

determining an adjusted learning rate based on the initial training effect; and obtaining the wear assessment model by continuing to train the initial wear assessment model based on the adjusted learning rate and one or more unused datasets from the plurality of training datasets until an end-of-training condition is met.

11. The method of claim 3, further comprising:

collecting dust information based on an environmental sensor; and adjusting the replacement priority based on workpiece material information and the dust information.

12. The system of claim 5, wherein the IIoT management platform is further configured to:

determine, based on the appearance information, the operational state information, and the machining quality information, the degree of wear of the CNC machine tool during the at least one time period via a wear assessment model; wherein the wear assessment model is a machine learning model, and the wear assessment model is obtained by training an initial wear assessment model.

13. The system of claim 12, wherein the IIoT management platform is further configured to:

determine, based on historical data, a plurality of training samples for training the initial wear assessment model and historical wear data corresponding to each of the plurality of training samples;

for each of the plurality of training samples, determine a historical degree of wear based on the historical wear data corresponding to the training sample, and determine the historical degree of wear as a label corresponding to the training sample;

divide the plurality of training samples into a plurality of training datasets based on the historical wear data;

perform at least one round of training on the initial wear assessment model based on at least one of the plurality of training datasets, and determine an initial training effect;

determine an adjusted learning rate based on the initial training effect; and obtain the wear assessment model by continuing to train the initial wear assessment model based on one or more unused datasets from the plurality of training datasets and the adjusted learning rate until an end-of-training condition is met.

14. The system of claim 8, wherein the IIoT management platform is further configured to:

collect dust information based on an environmental sensor; and adjust the replacement priority based on workpiece material information and the dust information.

* * * * *